US010957350B1

(12) United States Patent
Deokar et al.

(10) Patent No.: US 10,957,350 B1
(45) Date of Patent: Mar. 23, 2021

(54) HEAD GIMBAL ASSEMBLY WITH STRUCTURAL YAW STIFFENER

(71) Applicant: Seagate Technology LLC, Freemont, CA (US)

(72) Inventors: Rohit Deokar, Eden Prairie, MN (US); Razman Zambri, Eden Prairie, MN (US); Gary Berscheit, Watertown, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/887,447

(22) Filed: May 29, 2020

(51) Int. Cl.
*G11B 5/596* (2006.01)
*G11B 5/48* (2006.01)

(52) U.S. Cl.
CPC .............. *G11B 5/483* (2015.09); *G11B 5/486* (2013.01); *G11B 5/4826* (2013.01); *G11B 5/596* (2013.01)

(58) Field of Classification Search
None
See application file for complete search history.

(56) References Cited

U.S. PATENT DOCUMENTS

| | | | |
|---|---|---|---|
| 6,125,015 A | 9/2000 | Carlson et al. | |
| 6,801,400 B2 | 10/2004 | Fu et al. | |
| 8,780,504 B1 | 7/2014 | Teo et al. | |
| 8,797,690 B2 | 8/2014 | Tao et al. | |
| 8,896,969 B1* | 11/2014 | Miller et al. | G11B 5/483 360/294.4 |
| 8,941,952 B1 | 1/2015 | Pan et al. | |
| 8,976,491 B1 | 3/2015 | Chen et al. | |
| 9,064,513 B1 | 6/2015 | Pan et al. | |
| 9,659,587 B1 | 5/2017 | Khamnualthong et al. | |
| 2011/0096438 A1* | 4/2011 | Takada et al. | G11B 5/4853 360/245.3 |
| 2012/0087041 A1* | 4/2012 | Ohsawa | G11B 5/483 360/234.5 |
| 2012/0099226 A1* | 4/2012 | Zambri et al. | G11B 5/483 360/245.3 |
| 2014/0104722 A1* | 4/2014 | Wright et al. | G11B 5/483 360/294.4 |
| 2015/0138739 A1* | 5/2015 | Hishiki | G11B 5/4826 361/760 |
| 2016/0035968 A1* | 2/2016 | Sakakura et al. | G11B 5/4873 29/25.35 |
| 2018/0005653 A1* | 1/2018 | Pokornowski et al. | G11B 5/483 |
| 2018/0070448 A1* | 3/2018 | Sakakura et al. | G11B 5/484 |
| 2018/0070457 A1* | 3/2018 | Sakakura et al. | G11B 5/483 |
| 2018/0288883 A1* | 10/2018 | Sakakura et al. | G11B 5/483 |

* cited by examiner

*Primary Examiner* — Craig A. Renner (57) ABSTRACT

A head gimbal assembly for supporting a disk drive includes a slider, a load beam, a ring gimbal affixed to the load beam, a plurality of microactuators, and a flexure. The flexure includes a first end extending along the load beam through a center region of a longitudinal axis of the head gimbal assembly and second end that includes a plurality of bond pads electrically coupled to the slider. The flexure includes a plurality of support features. Each support feature of the plurality of support features spans a respective microactuator of the plurality of microactuators. Each support feature includes a support protrusion and a support base. Each support protrusion is coupled to the ring gimbal at a distal side of the respective microactuator and each support base is coupled to the flex circuit on a proximal side of the respective microactuator.

9 Claims, 6 Drawing Sheets

HEAD GIMBAL ASSEMBLY WITH STRUCTURAL YAW STIFFENER

TECHNICAL FIELD

The disclosure relates to ahead gimbal assembly for a hard disk drive.

BACKGROUND

Hard disk drives (HDDs) utilize a slider to read and write data on magnetic storage media. Typically, the slider is mounted on a head gimbal assembly (HGA). The HGA moves the slider on a thin cushion of air or gas just above the surface of the magnetic storage media. External forces exerted on the HDD may cause mechanical vibrations that match the natural resonant frequencies of the HGA. In some examples, if the frequency of the external vibrations match the natural resonant frequencies of the HGA, the slider may incorrectly read and/or write data on the magnetic storage media. Exciting the resonant frequencies of the HGA may potentially damage the slider or other components of the HGA, such as the microactuator.

SUMMARY

The present disclosure describes a head gimbal assembly (HGA) for a hard drive. The HGA is configured to increase the natural resonant frequency of the HGA in the yaw direction. In one example, the HGA includes a load beam, a slider, and a ring gimbal affixed to the load beam. The ring gimbal assembly includes a flexure configured to provide electrical signals to the slider. A first end of the flexure is mechanically coupled to the stator (e.g., a stable piece of the head gimbal assembly) at the leading edge of the HGA and a second end of the flexure is electrically coupled to the slider at the trailing edge of the HGA. The flexure includes a plurality of support features between the first end and the second end that mechanically couple the middle portion of the flexure to the ring gimbal.

In some examples, including a plurality of support features between the first and second ends of the flexure increases the stiffness of the HGA about a yaw axis. Increasing the stiffness about the yaw axis may increase the natural resonant frequency of the HGA about the yaw axis. Increasing the resonant frequency of the HGA about the yaw axis may decrease the likelihood of experiencing external vibrations having a frequency matching the natural resonant frequency. Reducing external vibrations with a frequency matching the natural resonant frequency may improve the ability of the HGA to accurately position the slider, which may enable the slider to more accurately read and write data on the magnetic media. Increasing the resonant frequency of the HGA may, in some scenarios, reduce the likelihood of damaging the slider or other components of the HGA, which may improve longevity and/or reliability of the hard drive.

In one example, a head gimbal assembly for supporting a disk drive includes a slider, a load beam, a ring gimbal affixed to the load beam, a plurality of microactuators, and a flexure. The flexure includes a first end extending along the load beam through a center region of a longitudinal axis of the head gimbal assembly and second end that includes a plurality of bond pads electrically coupled to the slider. The flexure includes a plurality of support features. Each support feature of the plurality of support features spans a respective microactuator of the plurality of microactuators. Each support feature includes a support protrusion and a support base. Each support protrusion is coupled to the ring gimbal at a distal side of the respective microactuator and each support base is coupled to the flex circuit on a proximal side of the respective microactuator.

These and other features and aspects of various examples may be understood in view of the following detailed discussion and accompanying drawings.

DETAILED DESCRIPTION

Figure 1:
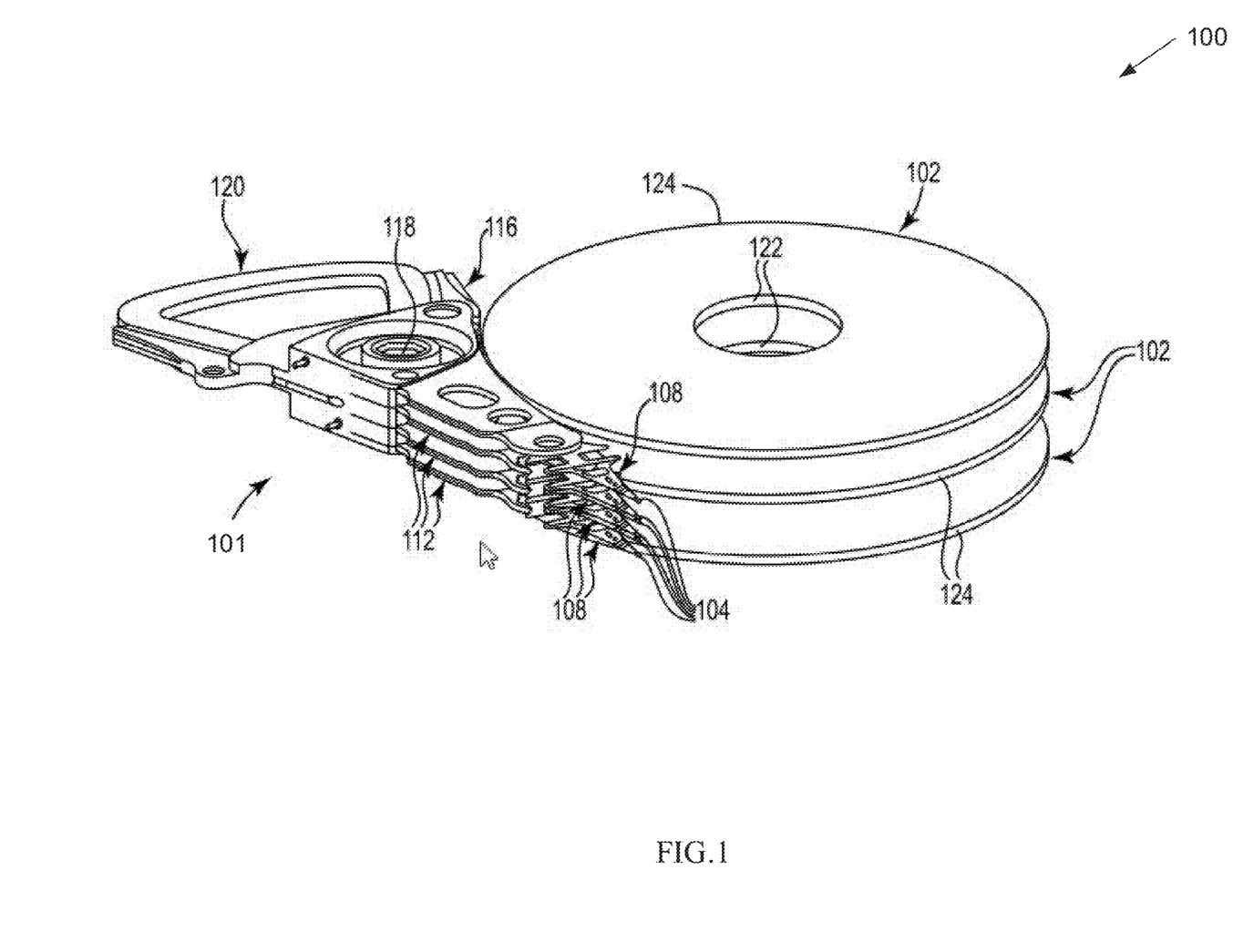
FIG. 1 is a perspective view of a hard disk drive, according to various aspects of the present disclosure.

FIG. 1 is a perspective view of a hard disk drive, according to various aspects of the present disclosure. Hard disk drive 100 includes a head stack assembly 101 and magnetic media 102. In one example, magnetic media 102 includes magnetic disks that each store information or data in a plurality of circular, concentric data tracks.

Head stack assembly 101 includes a voice coil drive actuator 120, an actuator mechanism 116, shaft 118, a plurality of rotatable drive actuator arms 112, and a plurality of head gimbal assemblies 108. Voice coil drive actuator 120 is controlled by servo control circuitry. Voice coil drive actuator 120 is configured to rotate actuator mechanism 116 about shaft 118 in either rotational direction. Rotatable drive actuator arms 112 are each coupled to a respective HGA of HGAs 108, such that rotating actuator mechanism 116 causes rotatable drive actuator arms 112 and HGAs 108 to move relative to magnetic media 102. Each HGA 108 includes a respective slider 104. Positioning HGAs 108, and thus sliders 104, over the surfaces of magnetic media 102, between inner diameters 122 and outer diameters 124 of magnetic media 102 enables sliders 104 to read data from and write data to magnetic media 102. In some examples, sliders 104 are themselves aerodynamically designed to fly on an air bearing that is created adjacent to each disk surface during disk rotation.

Figure 2:
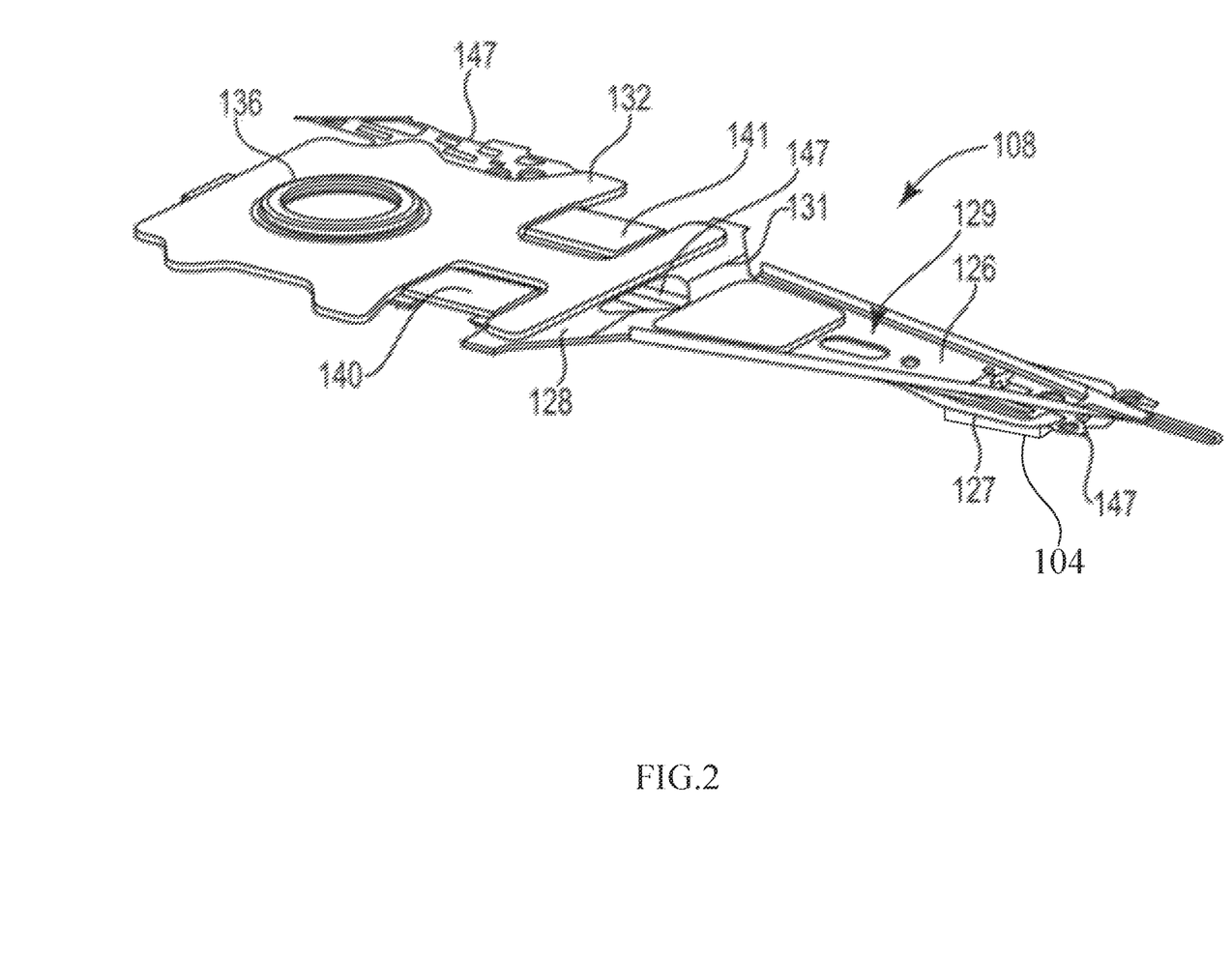
FIG. 2 is a perspective view of an example head gimbal assembly, according to various aspects of the present disclosure.

FIG. 2 is a perspective view of HGA 108 of FIG. 1, according to various aspects of the present disclosure. HGA 108 includes a baseplate or mount 132, a load beam 126, a gimbal 127, and a slider 104.

Baseplate 132 includes an attachment structure 136, such as a boss tower, that is configured to couple to actuator arm 112 of FIG. 1. In one example, attachment structure 136 is integrally formed with baseplate 132. Baseplate 132 and attachment structure 136 may each be made of a ferrite (e.g., stainless steel) or other suitable material (e.g., aluminum, engineered plastic, and the like).

In one example, load beam 126 includes a base portion 128, a hinge region 131, and a rigid region 129. Load beam 126 may be made of a ferrite (e.g., stainless steel) or other suitable material. Base portion 128 of load beam 126 is mechanically coupled to baseplate 132. In some examples, base portion 128 is coupled to baseplate 132 via welding (e.g., laser welding). Hinge region 131 (also referred to as a spring region) provides load beam 126 with a preload force that acts against the lift force action of slider 104 as slider 104 flies relative to the disk surface. The preload force urges slider 104 towards the surface of a magnetic media 102 during flight to maintain a desired fly height. In some examples, hinge region 131 is integrated with and contiguous with load beam 126 as a single part.

Rigid region 129 of load beam 126 extends from hinge region 131 to the tip of the HGA 108. In the example of FIG. 2, hinge region 131 is disposed between base portion 128 and rigid region 129.

Gimbal 127 provides a slider mounting portion that is pivotable about a dimple on load beam 126, as provided from an end portion of the rigid region 129 of the load beam 126. Gimbal 127 provides a moveable slider mounting pad to which slider 104 is attached so that slider 104 can move in the pitch, roll, and yaw directions in response to variations while flying relative to a disk surface.

As shown in the example of FIG. 2, HGA 108 includes a pair of microactuators 140 and 141. While voice coil drive actuator 120 of FIG. 1 rotates actuator mechanism 116 to provide relatively coarse positioning of sliders 104, microactuators 140 and 141 provide HGA 108 with relatively fine or precision positioning of slider 104 at the surface of magnetic media 102. In one example, microactuators 140 and 141 are piezoelectric microactuators. Piezoelectric microactuators convert an electrical signal into controlled physical displacements. In another example, microactuators 140 and 141 include lead zirconate titanate (PZT)

In some examples, HGA 108 includes flexure 147. Flexure 147 includes a plurality of electrical conductors 301 (also referred to as electrical leads or electrical traces) that provide electrical signals for communication with the read and write heads of slider 104 as well as for microactuator control. In some examples, flexure 147 includes a substrate or bottom layer of insulating material (e.g., polyimide), capped with a top layer of insulating material (e.g., polyimide) with a layer of semi-rigid conducting material (e.g., copper or stainless steel) disposed between the top and the bottom insulating layers.

Flexure 147 may, in some examples, be bonded along HGA 108. In reference to FIG. 2, flexure 147 runs along load beam 126 from the base portion 128 to rigid region 129 to electrically connect with the read/write head of the slider 104.

Figure 3:
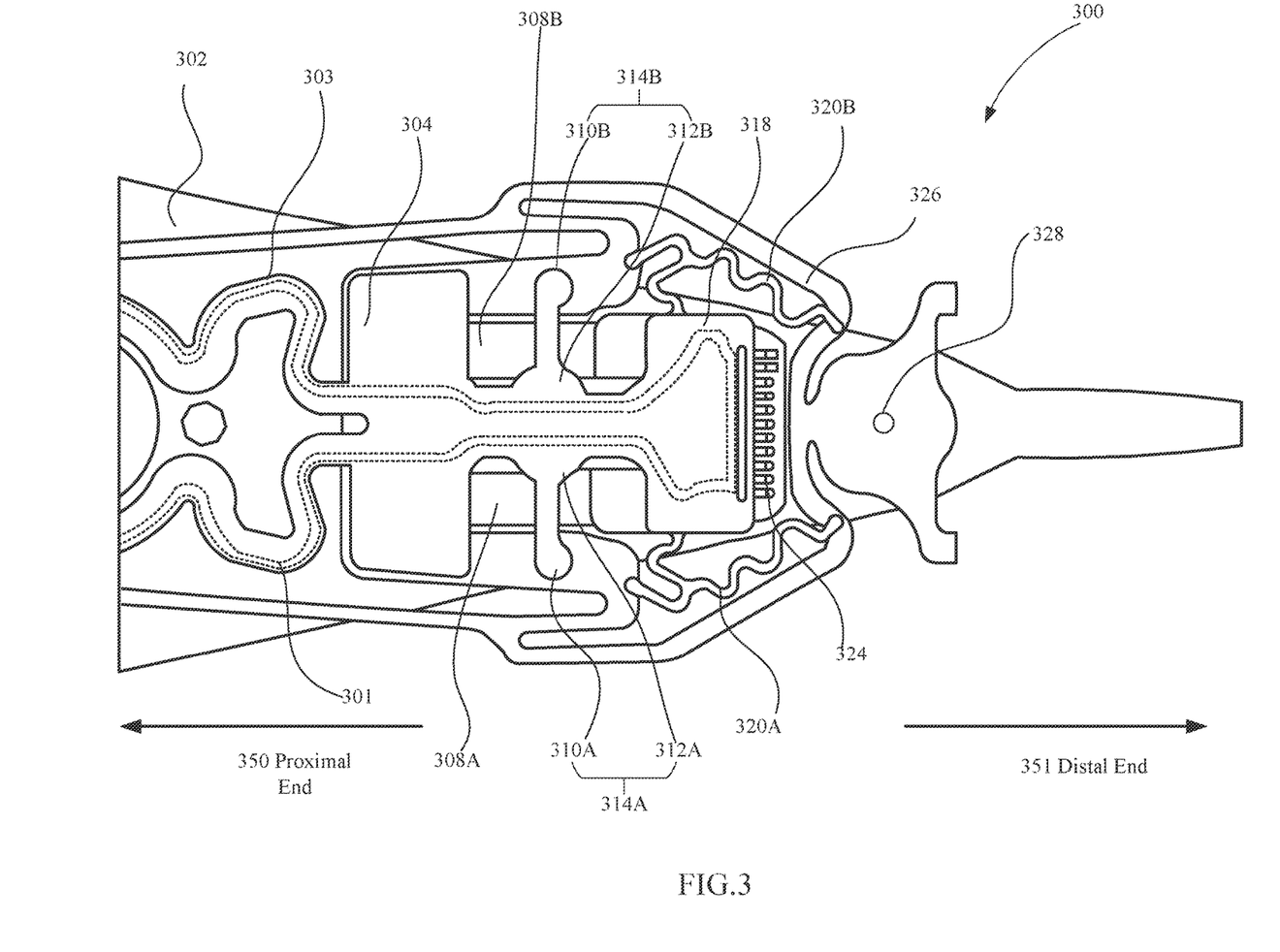
FIG. 3 is a bottom view of an example head gimbal assembly, according to various aspects of the present disclosure.

FIG. 3 is a bottom view of an example head gimbal assembly, according to various embodiments of the present disclosure. Head gimbal assembly 300 is an example of head gimbal assembly 108 of FIGS. 1 and 2. In the example of FIG. 3, head gimbal assembly 300 includes a load beam 302, a flexure 303, a stator region 304, a plurality of microactuators 308A and 308B (collectively microactuators 308), a tongue region 318 (also referred to as a rotor region), a plurality of flexible tethers 320A and 320B (collectively flexible tethers 320), gimbal 326, and a plurality of support features 314A and 314B (collectively support features 314).

Load beam 302 has longitudinal length and includes proximal end 350 and distal end 351 that is opposite proximal end 350. Proximal end 350 includes the leading edge of the head gimbal assembly 300 and the distal end 351 includes the trailing edge of the head gimbal assembly 300. The terms "leading edge" and "trailing edge" refer to the direction of travel of the magnetic media underneath the slider. In the example shown in FIG. 3, the magnetic media travels from the proximal end 350 of the head gimbal assembly 300 to the distal end 351 of the head gimbal assembly 300.

Gimbal 326 has a top surface and a bottom surface. The bottom surface of gimbal 326 is configured to face the magnetic media side of the load beam 302 and includes the tongue region 318 to which the slider (not shown in FIG. 3) is secured. Gimbal 326 and tongue region 318 allow for the slider to move in pitch and roll directions while flying relative to the disk surface. The slider may also move in the yaw direction while flying relative to the disk surface. In some examples, gimbal 326 provides support for flexure 303 and is coupled to load beam 302 at weld point 328. In some examples, gimbal 326 may be made from stainless steel.

In some examples, flexible tethers 320 within distal end 351 are configured to act as stabilizers and restrain movement of the head-carrying region of the head gimbal assembly 300 in the z-direction (e.g., out of the page), also referred to as the down track direction. Though the flexible tethers 320 are intended to provide restraint to shock movement of the head-carrying region, in some examples, flexible tethers 320 are constructed from a low-stiffness material such that the freedom of movement of the head carrying region is not restrained. In one example, flexible tethers 320 may include a polyimide layer.

In the example of FIG. 3, flexure 303 electrically connects the read and write heads of the slider (not shown in FIG. 3), microactuators 308, and a plurality of bond pads 324 to an external control system. Flexure 303 can include any number of leads or traces. In some examples, flexure 303 includes a plurality of stacked layers, such as one or more conducting layer and one or more insulating layer. In some examples, the stacked layers include a top layer of insulating material (e.g., polyimide), a middle layer of conducting material (e.g., copper, stainless steel, or an alloy conductor), and a bottom layer of insulating material.

Flexure bond pads 324 provide a termination point for flexure 303 at the distal end 351 of the head gimbal assembly 300. Bond pads 324 are typically connected to the slider bond pads (not shown) by solder ball bonding. Flexure 303 extends along the load beam 302 through a center region of head gimbal assembly 300. Flexure 303 is tethered at the proximal end 350 of head gimbal assembly 300 at stator region 304 and is connected to tongue region 318 towards the distal end 351 of the head gimbal assembly 300.

In one example, flexure 303 includes a plurality of support features 314 configured to provide yaw support. Each of support features 314 span a respective microactuator 308. Support features 314A and 314B include support protrusions 310A and 310B, respectively, and support base bases 312A and 312B, respectively. Support protrusions 310A and 310B (collectively, support protrusions 310) couple to a top surface of gimbal 326. Support bases 312A and 312B (collectively, support bases 312) extend from a middle portion of flexure 303. In the example of FIG. 3, support bases 312 are wider than support protrusion 310. In one example, support bases 312 may taper to support protrusion 310. In some examples, utilizing support bases 312 that are wider than support protrusions 310 and tapering the support bases 312 into support protrusions 310 may increase the resonant frequency of the head gimbal assembly.

In some examples, the support features 314 are not electrically active. That is, in some examples, support features 314 do not include electrical traces 301 and do not provide electrical signals for communication with the read and write heads of slider 104. In some examples, the width of support bases 312 and support protrusions 310 are narrower than the width of electrical traces 301 (e.g., when support features 314 do not include electrical traces 301). In contrast to examples of support bases that include electrical traces, utilizing support features 314 that do not include electrical traces 301 may increase the degrees of freedom in designing support features 314 (e.g., the shape, dimensions, and materials of support features 314), which may enable designs of support features 314 that increase the resonant frequency of HGA 300.

Figure 4:
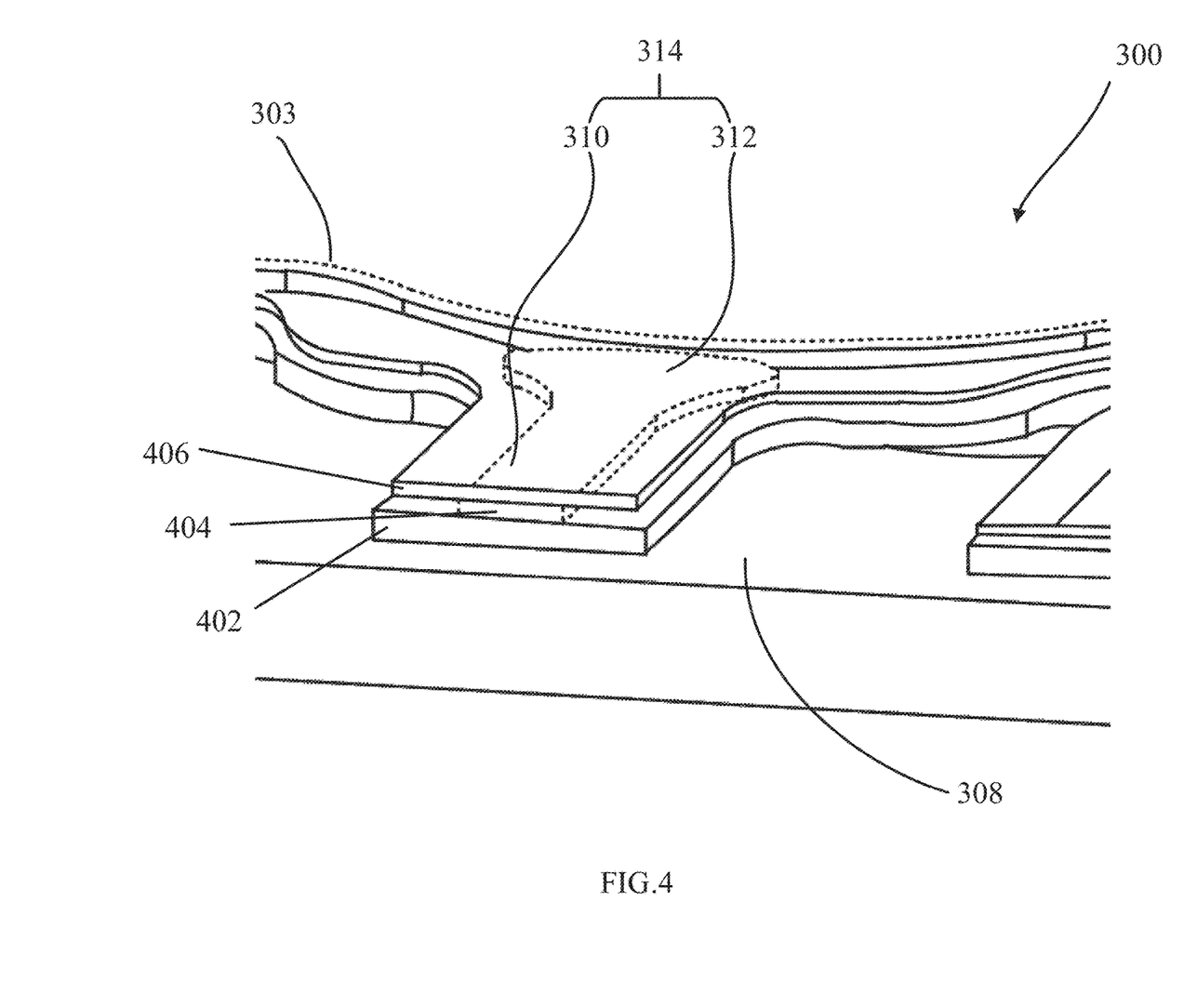
FIG. 4 is a cross-sectional view of a portion of the example head gimbal assembly of FIG. 3, according to various aspects of the present disclosure.

FIG. 4 is a cross-sectional view of an example head gimbal assembly, according to various aspects of the present disclosure. In some examples, support feature 314 extends from a middle portion of flexure 303. Support feature 314 includes a support base 312 and a support protrusion 310. In the example of FIG. 4, support protrusion 310 spans microactuator 308.

Support base 312 extends from a middle portion of flexure 303 on the proximal side of microactuator 308. As described herein, the proximal side of microactuator 308 is defined as the side being closest to the middle portion of flexure 303. Including support feature 314, which extends from a middle portion of flexure 303, may provide stiffness to the head gimbal assembly while potentially increase the degrees of freedom for other aspects of head gimbal assembly 300.

In some examples, support feature 314 includes a multilayer structure. For example, as illustrated in FIG. 4, support feature 314 includes layers 402, 404 and 406. In one example, support feature 314 includes a first insulating layer 402, a conducting layer 404 stacked on the first insulating layer 402, and a second insulating layer 406 stacked on conducting layer 404.

Figure 5:
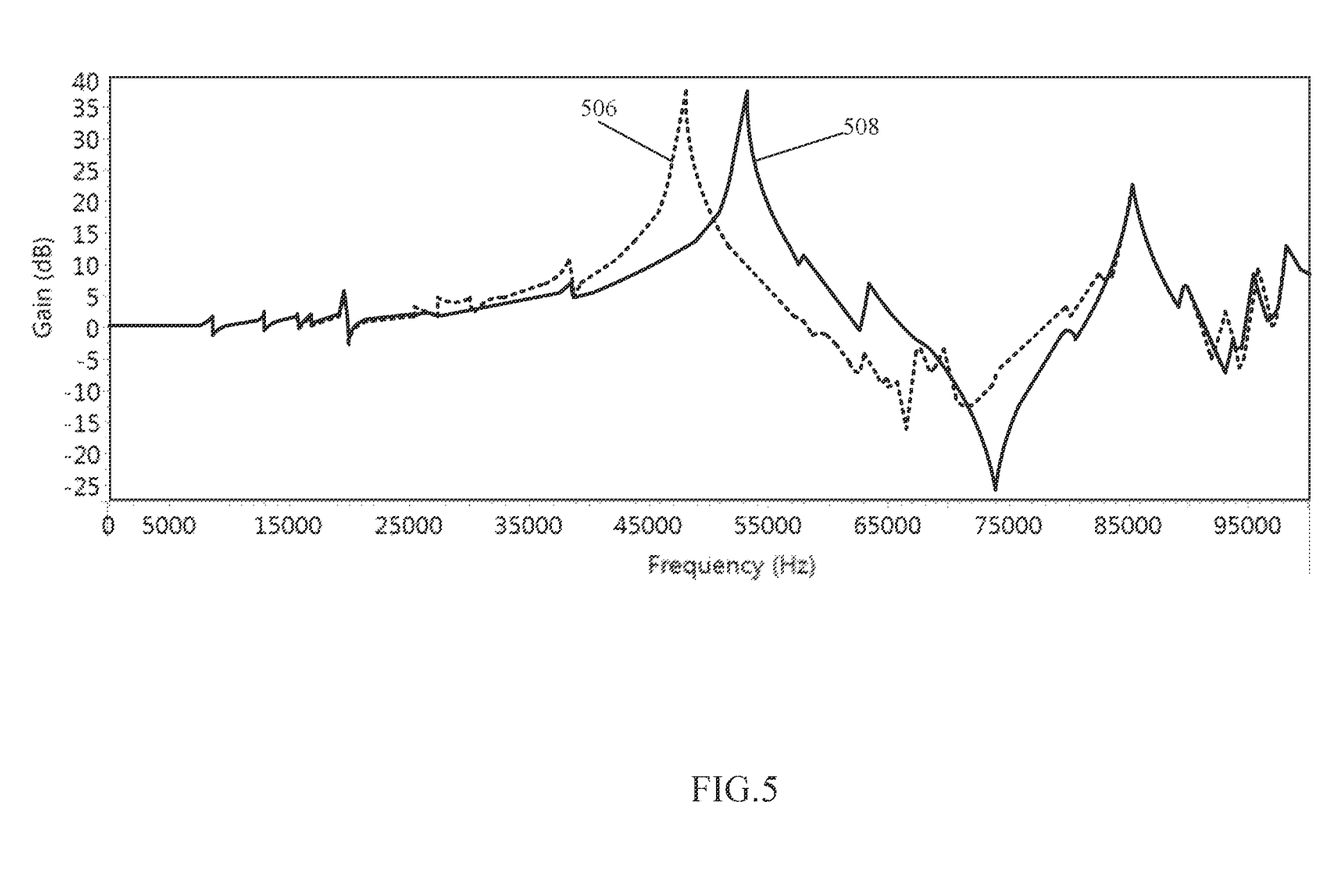
FIG. 5 is a Bode Plot of frequency response of an example head gimbal assembly, according to various aspects of the present disclosure.

FIG. 5 is a Bode Plot that shows a measure of structural frequency response to an input excitation of the head gimbal assembly 300 of FIG. 3, according to various embodiments of the present disclosure. In hard disk drives there are several sources of excitation that can cause the head gimbal assembly to resonate at different frequencies. In some examples, the resonant frequency of head gimbal assembly 300 corresponds to an increase in amplitude of oscillation that is equal to or very close to the natural undamped frequency of head gimbal assembly 300. Vibration of the suspension at a resonant mode can interfere with accurate positioning of the slider, thus hard disk drive electronics are designed in such a way as to accept a certain amount of amplitude at certain frequency ranges. In some instances, increasing stiffness and/or lowering mass of head gimbal assembly 300 may reduce the off-track response of the slider.

As shown in FIG. 5, multiple peaks in the Bode Plot can be observed at specific frequencies and these peaks represent multiple resonance modes of head gimbal assembly 300 of FIG. 3. Increasing the resonant frequency may reduce the likelihood of damage of the slider or other components of the HGA. In some examples, utilizing support features 314 as shown in FIG. 3 may increase stiffness of head gimbal assembly 300, which may increase the resonant frequency of HGA 300. The dotted line plot 506 represents multiple resonance modes of an example head gimbal assembly that does not include support features 314, whereas the solid line plot 508 represents multiple resonance mode of head gimbal assembly 300 that includes support features 314. High frequency modes illustrated by line plots 506, 508 represent the natural frequency of a head gimbal assembly and may represent the yaw frequencies for various examples of the present disclosure.

As illustrated in FIG. 5, support features 314 may increase stiffness of HGA 300 in the yaw direction, which may increase the system frequency of HGA 300. For example, as illustrated in FIG. 5, utilizing support features 314 may increase yaw frequency by approximately 10 kHz relative to head gimbal assemblies that do not include support features 314, thereby potentially increasing accuracy of the slider placement and/or longevity of various components of the hard disk drive.

Figure 6:
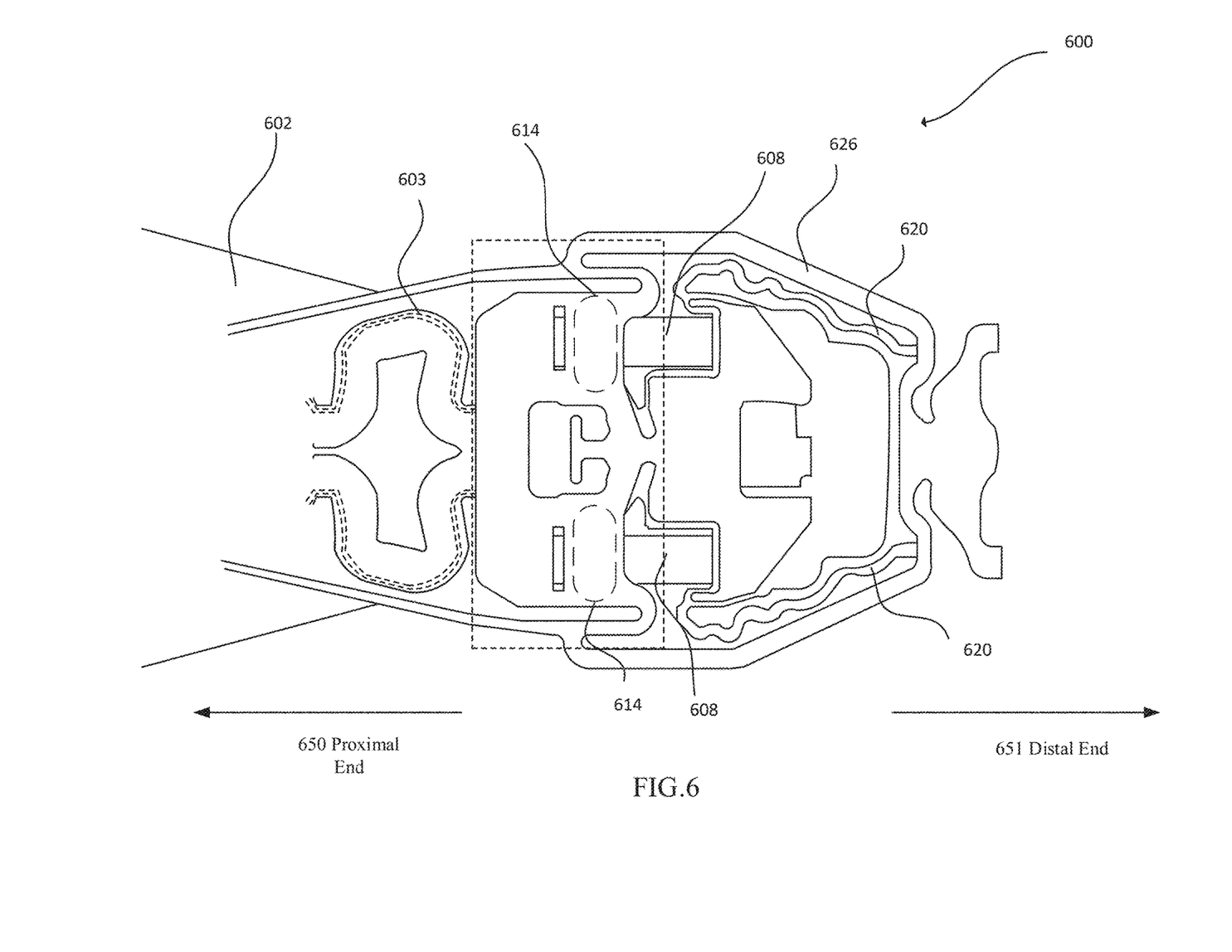
FIG. 6 is a top view of an example head gimbal assembly, according to various aspects of the present disclosure.

FIG. 6 is a top view of an example head gimbal assembly, according to various aspects of the present disclosure. Head gimbal assembly 600 is an example of head gimbal assembly 108 of FIGS. 1 and 2. In the example of FIG. 6, head gimbal assembly 600 includes a load beam 602, a flexure 603, a plurality of microactuators 608, a plurality of flexible tethers 620, a gimbal 626, and a support feature 614.

Load beam 602 has longitudinal length and includes proximal end 650 and distal end 651 that is opposite proximal end 650. Proximal end 650 includes the leading edge of the head gimbal assembly 600 and the distal end 651 includes the trailing edge of the head gimbal assembly 600.

Gimbal 626 comprises a support feature 614 extending from a middle portion of gimbal 626. In the example of FIG. 6, support feature 614 spans respective microactuators 608. Including a support feature 614 as part of gimbal 626 may increase stiffness to HGA 600. In some examples, support feature 614 is integrally formed as part of gimbal 626. For example, support feature 614 may be formed from the same material as the rest of gimbal 626 and may be coupled to the rest of gimbal 626 without seams.

Various examples have been presented for the purposes of illustration and description. These and other examples are within the scope of the following claims.

What is claimed is:

1. A head gimbal assembly for a disk drive, the head gimbal assembly comprising:
 a slider including a read head and a write head;
 a load beam; and
 a gimbal affixed to the load beam;
 a plurality of microactuators; and
 a flexure comprising:
  a first end extending along the load beam through a center region of a longitudinal axis of the head gimbal assembly;
  a second end comprising a plurality of bond pads electrically coupled to the slider;
  a middle portion disposed between the first end and the second end;
  a plurality of electrical traces configured to provide electrical signals to the read head and the write head, wherein the plurality of electrical traces traverse the first end, the middle portion, and the second end; and
  a plurality of support features that each span a respective microactuator of the plurality of microactuators, wherein each support feature includes a support base that extends from the middle portion of the flexure on a proximal side of the respective microactuator and a support protrusion that extends from the support base, and is coupled to the gimbal at a distal side of the respective microactuator, wherein the plurality of support features do not include the plurality of electrical traces.

2. The head gimbal assembly of claim 1, wherein each support protrusion spans the respective microactuator.

3. The head gimbal assembly of claim 1, wherein the plurality of support features mechanically couple the middle portion of the flexure to a bottom surface of the gimbal.

4. The head gimbal assembly of claim 1, wherein a bottom surface of the gimbal is coupled to a top surface of the flexure.

5. The head gimbal assembly of claim 1, wherein a width of the plurality of support feature features is narrower than a width of the plurality of electrical traces.

6. The head gimbal assembly of claim 1, wherein the support features comprise a multilayer including a first insulating layer, a second insulating layer, and a conducting layer between the first insulating layer and the second insulating layer.

7. The head gimbal assembly of claim 6, wherein the first insulating layer and the second insulating layer comprise polyimide.

8. The head gimbal assembly of claim 6, wherein the conducting layer comprises copper.

9. The head gimbal assembly of claim 1, wherein the support features comprise stainless steel.

\* \* \* \* \*